May 4, 1937.  A. G. THOMAS  2,079,366
FILTER
Filed May 27, 1936
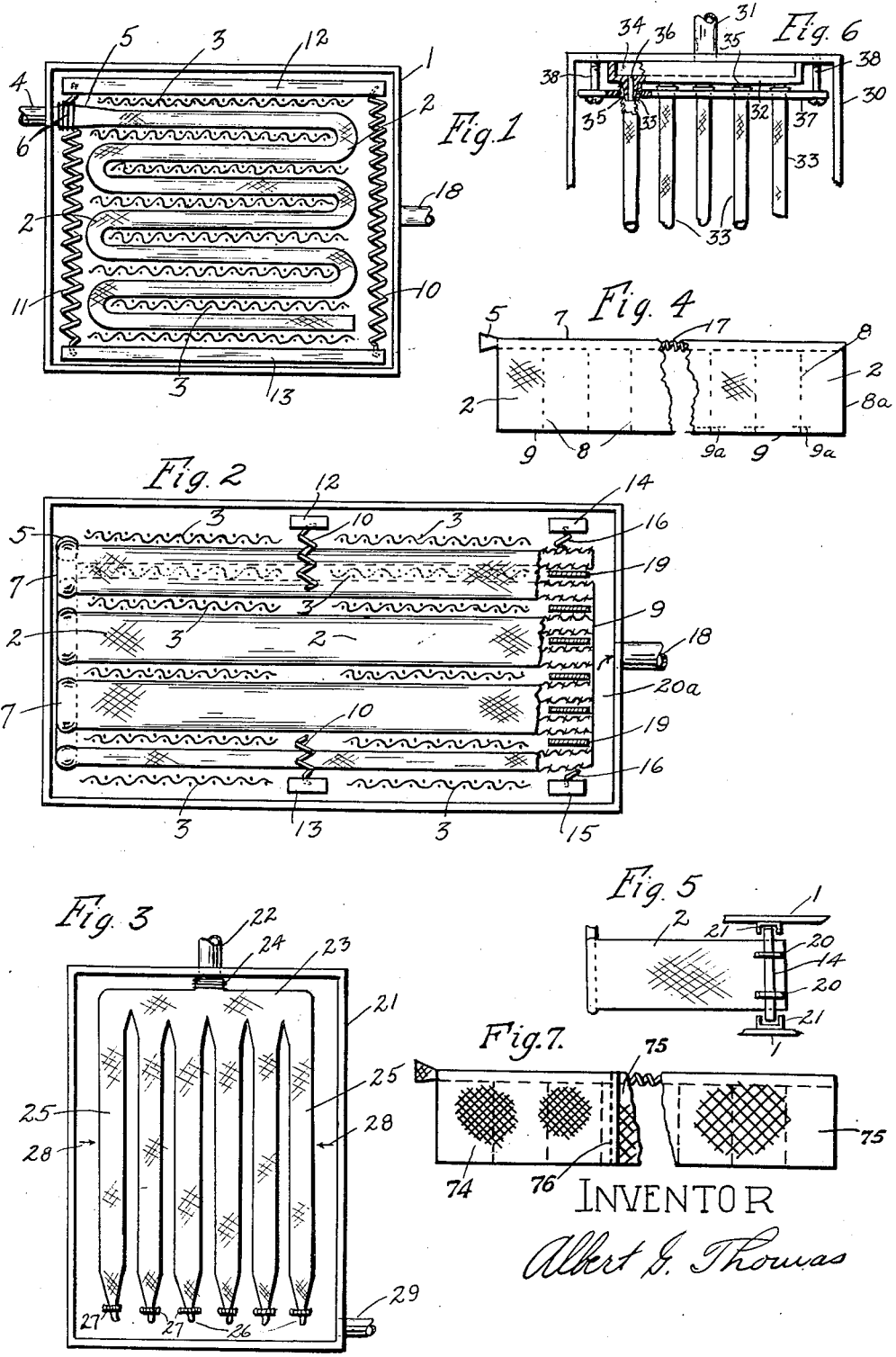
INVENTOR
Albert G. Thomas Patented May 4, 1937

2,079,366

UNITED STATES PATENT OFFICE 2,079,366

FILTER

Albert G. Thomas, Lynchburg, Va.

Application May 27, 1936, Serial No. 82,008

8 Claims. (Cl. 210—164)

This invention relates to filters such as those used for cleaning oil in an automobile engine.

An object is to provide a filter that will filter all of the oil circulating through an engine rather than a part.

Another object is the provision of a filter through which all the oil may be passed without danger of stoppage of the oil supply to the various engine parts.

A further object is to provide a cheaply constructed filter of large area with openings that separate to relieve excessive pressure, which openings at the same time act as filters.

Additional objects will appear in the following specification.

In the drawing:

Figure 1 is an end elevation of a bag-type filter with casing end plate removed.

Figure 2 is a side elevation in part section, of the filter shown in Figure 1, with side casing plate removed.

Figure 3 is an end elevation of a filter consisting of a bag with a plurality of rectangular filter bags connecting.

Figure 4 is a broken, plan view showing the type of bag used in the filter of Figure 1.

Figure 5 is a plan view of a filter bag section with guide straps.

Figure 6 is a fragmentary front view, in part section, of a filter with separate filter-bags.

Figure 7 is a broken, plan view of a filter bag composed of sections of cloth of different weave.

In Figure 1 filter casing 1 is of rectangular cross section and contains bag-like filter 2 made of cotton cloth, or of any suitable porous material and folded as shown with wire screening 3 placed between the folds to act as oil channels. Inlet pipe 4 is fastened into casing 1 by threading or otherwise, and flat, folded filter bag 2 has an open corner funnel 5 which is slipped over the inlet pipe 4 and is tied tightly around this pipe by means of wire 6 or a suitable clamp. The filter bag is of the general shape shown in Figure 4, the folds being made along the dotted lines 8.

A flexible coiled wire spring 17 is placed in bag 2 extending along the entire edge 7, from inlet opening 5 to the end 8a. This spring serves to conduct oil along the edge 7 to all parts of filter bag 2. The edge 9 of bag 2 is left open so that oil can escape when the pressure in the bag is too high.

As shown in Figure 2, screens 3 are placed above, below, and between the folds of bag 2 with a central section of the bag unprotected by the screening so that tension springs 10 and 11, fastened to bars 12 and 13 extending across bag 2, will normally pull these bars toward each other to compress the folds of bag 2 together in the central section. Similarly bars 14 and 15, pulled by spring 16, will normally compress the open edge 9 of bag 2 to prevent the escape of oil under normal conditions. Springs 10 and 16 are shown broken. A spring similar to spring 16 is of course used on the opposite ends of bars 14 and 15.

In the operation of the filter, oil is admitted under pressure through pipe 4 from which it enters funnel 5, whence it flows through hollow coiled spring 17. The oil flows through the spaces between the wires of this spring to fill and expand all parts of filter bag 2. The screening 3 prevents contact of the folded filter surfaces so that there will always be passages for the oil filtering through bag 2 to flow into the interior of casing 1 and from there out of drain pipe 18. Spring 17 may be held in place by stitching, by wire, or in any convenient manner.

The oil flows from edge 7 toward open edge 9 of bag 2, part of the oil filtering through the bag in the meantime. As the interior of bag 2 becomes coated with sediment out of the oil a higher pressure will be developed within the bag until finally the pressure will be sufficient to force bars 14 and 15 apart against the spring tension normally pulling them together. Therefore, when the interior of bag 2 becomes too thickly coated, the oil will escape through open edge 9 but it will be filtered in the process since the bars 14 and 15 tend to press the layers of folded open edge 9 together. A series of narrow bars may be used in place of bars 14 and 15 or the bars may be grooved to form small pockets to trap sediment when oil passes out of open edge 9. In addition the filter bag 2 may be pleated or otherwise made to form pockets to trap sediment and to prevent solid material from being forced out. The width of the layers of cloth pressed between bars 14 and 15 may be such that very little solid matter will be ejected. If desired, the bends may be stitched together as shown at 9a (Fig. 4) so that only the centrally located edges of the various folded layers of bag 2 will separate to allow oil to pass. In this way it will be easier to press the folds together, as bars 14 and 15 may be made thicker in the central portions.

Similarly bars 12 and 13 may be used as a filtering relief valve or any number of such spring-pressed bars may be used. These bars are shown as abnormally separated in the drawing, for the sake of clearness.

Flat strips 19 may be placed between the folds of open edge 9 so that the cloth layers may be more readily pressed together. These strips may be fastened to screening 3 or they, and bars 14 and 15, may be passed through guide straps 20 sewed to the folds of bag 2, as shown in Figure 5. Cross bars 14 and 15 may be placed in channels 21 fastened to casing 1 to keep the various parts in place. Sharp prongs on bars 14 and 15 may also be used to puncture the fabric of bag 2 and prevent end 9 from slipping out of alignment with the bars, or end 9 may be beaded.

A series of short lengths of perforated metal tubing may be used in place of spring 17 but the spring is a simple and very practical means for supplying oil to the entire filter bag, although it is not essential.

Filter bag 2 may be constructed in sections of cloth of different weave or of a different number of layers. For instance the first section, extending from edge 7 to a plane passing through bars 12 and 13, may be of fine weave and the second section extending from the aforesaid plane to edge 9 may be of coarser weave so that if the first section becomes clogged the bars 12 and 13 will be forced apart slightly so that the oil will be admitted to a filter section of coarser weave. Then the coarse section of bag 2 will retain any lumps of solid matter that may pass between the spring pressed layers of cloth of coarse weave. Any number of bag sections of different weave may be sewed together along lines parallel to line 9 of Figure 4 so that if the edges along line 9 were finally forced open, not much solid matter would be discharged.

Suitable baffles of cloth or screening or of metal plates may be placed in space 20a between the edge 9 and outlet pipe 18, which is shown extending beyond the casing in Figure 1. In Figure 2, outlet pipe 18 may be placed at the top of casing 1 and space 20a may be enlarged to form a settling basin for any solid matter that may be forced from bag 2.

This method of folding the bag provides a large filtering area and the open end is in effect a filtering relief valve so that danger of stoppage of the oil supply when the filter is very dirty or the oil is very cold, is eliminated. The bag could also be wound into spiral or other shapes.

In Figure 3, narrow, rectangularly shaped filter bags 25, seen endwise, are sewed together at the top to form a common bag-like cover 23 into which all the bags 25 lead. Sleeve 24 is provided as before and is fastened in liquid tight fashion to inlet pipe 22 which is threaded into casing 21. Oil passing through inlet pipe 22 enters and distends bag 23 and also bags 25 so that a large filtering area is furnished. Screening may of course be placed between the bags 25 to prevent them from touching. The ends 26 of bags 25 are open and may be pressed together by bars similar to bars 14 and 15 of Figure 2 or the springs 27 may be passed completely around the ends of the bags, being suitably attached by wire or otherwise so that they will not slip off. The filtered liquid will pass into the interior of casing 21 and out pipe 29. Additional compression may be put on bags 25 along a line indicated by arrows 28.

The filter may be constructed of separate filter bags as shown in Figure 6. Casing 30 shown broken away, has inlet pipe 31 leading into manifold space 34 bounded by the casing and dishlike metal cover 32 with which bevelled teats 35 are integrally formed. These teats may be long and of rectangular cross section or of any suitable shape and they are provided with slots or holes 36 for conducting oil from space 34 into filter bags 33 the ends of which are pressed against the sloping surfaces of teats 35 by slotted plate 37 which is pulled towards cover 32 by bolts 38 which are threaded into casing 30. The construction of the teat and bag ends is shown in the sectional portion of Figure 6. Part of cover 32 is shown broken away also. The lower ends of cloth bags 33 are yieldingly closed as previously described for the other filters. The construction of Figure 6 is an alternative design.

Many changes of detail are possible. For instance in Figure 2 the screens 3 may be continuous and not separated as shown. Likewise spring 10 may be passed completely around the filter folds. Suitable guides or cages may be employed to keep the various parts in proper alignment and the filter bags may be constructed of a single thickness of cloth or of a plurality of layers. Likewise the screening may be of coarse or fine mesh and of one or more layers although it is preferable to have it of sufficiently heavy wire to form adequate oil channels.

In Figure 7 the filter bag consists of section 74 sewed to section 75 by means of stitches 76. This bag is similar to the bag of Figure 4 except that section 74 is made of cloth of fine weave and section 75 is made of cloth of coarse weave to act in effect as a filtering by-pass for the material of fine weave.

What I claim is:

1. In a filter, a casing, an inlet and an outlet for liquid in said casing, a filter bag within said casing and connected with said inlet to be supplied interiorly with liquid therefrom, an elongated opening in said bag, and spring-operated means yieldingly closing said opening.

2. In a filter, a casing, an inlet and an outlet for liquid in said casing, a filter bag within said casing and connected with said inlet to be supplied interiorly with liquid therefrom, an elongated opening in said bag, said opening having boundary walls formed by said bag, and means for yieldingly compressing said walls to close said opening.

3. In a filter, a casing, an inlet and an outlet for liquid in said casing, a folded filter bag within said casing and connected with said inlet to be supplied interiorly with liquid therefrom, an elongated opening in said bag, and resilient means compressing a portion of said folded filter bag to yieldingly close said opening.

4. In a filter, a casing, an inlet and an outlet for liquid in said casing, a filter bag with folds in parallel planes within said casing and connected with said inlet to be supplied interiorly with liquid therefrom, an elongated opening in said bag, and means for yieldingly pressing a part of said folds together to close said opening, said means cooperating with means for guiding said folds in yielding movement.

5. In a filter, a casing, an inlet and an outlet for liquid in said casing, a filter bag formed into folds within said casing and connected with said inlet to be supplied interiorly with liquid therefrom, one folded edge of said bag being open, and yielding means compressing said folded open edge to keep it closed except when excess pressure above a predetermined value exists in said bag.

6. In a filter, a casing, an inlet and an outlet for liquid in said casing, a filter bag within said casing and connected with said inlet to be supplied interiorly with liquid therefrom, a plurality of openings in said bag, and yielding means compressing portions of said bag adjacent said openings to close said openings.

7. In a filter, a casing, an inlet and an outlet for liquid in said casing, a folded filter bag within said casing and connected with said inlet to be supplied interiorly with liquid therefrom, spring operated members compressing portions of said bag to form separate chambers in said bag, and an elongated opening in said bag, said opening being yieldingly closed by other spring operated members.

8. In a filter, a casing, an inlet and an outlet for liquid in said casing, a filter bag within said casing and connected with said inlet to be supplied interiorly with liquid therefrom, an elongated opening in said bag, resilient means compressing a portion of said bag to keep said opening yieldingly closed, portions of said bag being composed of finely woven material to trap small particles in said liquid and other portions of loosely woven material to trap large particles in said liquid, said loosely woven material acting in effect as a filtering by-pass for said finely woven material.

ALBERT G. THOMAS.